May 2, 1967     S. S. C. FLEISCHER ETAL     3,316,950
RECEPTACLES OF PLASTIC
Filed Oct. 5, 1964
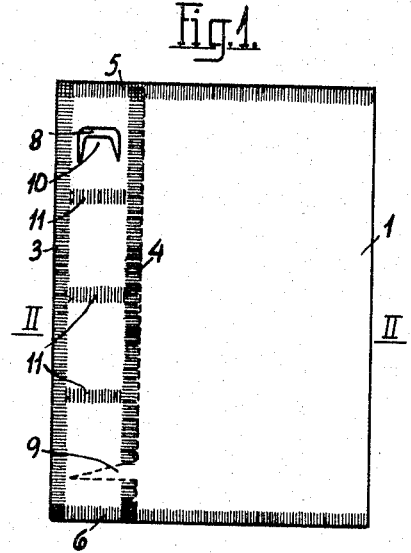
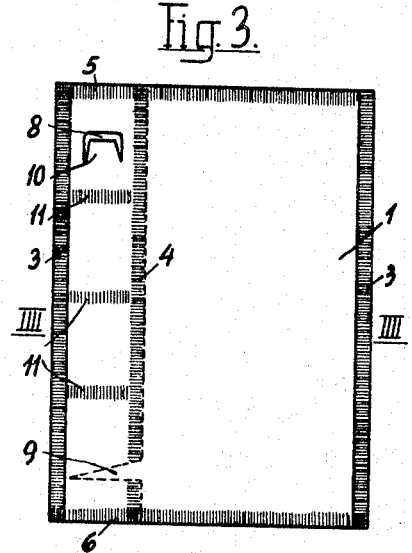
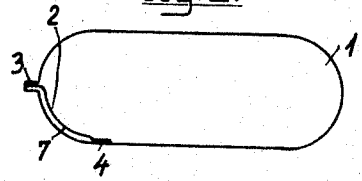
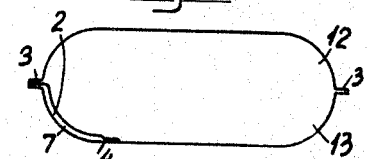
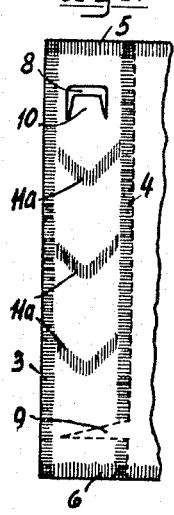
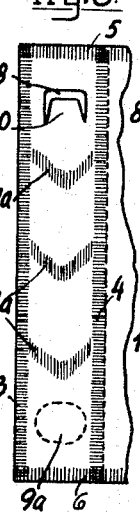
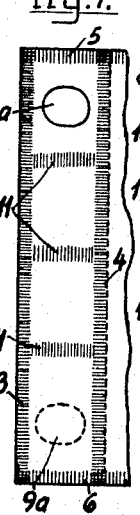
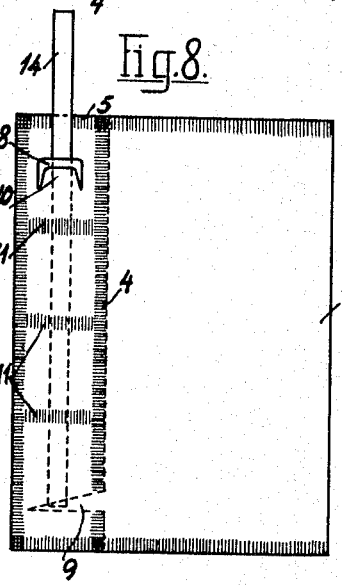
INVENTORS
Svend Sigurd Christie Fleischer
Hans Harald Christie Fleischer
By- H. B. Willson & Co.

United States Patent Office 3,316,950
Patented May 2, 1967

3,316,950
RECEPTACLES OF PLASTIC
Svend Sigurd Christie Fleischer and Hans Harald Christie Fleischer, both of Kroyersvej 14, Klampenborg, Denmark
Filed Oct. 5, 1964, Ser. No. 401,436
7 Claims. (Cl. 150—9)

This invention relates to receptacles formed of a synthetic plastic material and including integrally therewith discharge passage means having at one end an inlet opening communicating with the receptacle interior, and at the other end an outlet opening. The receptacle is adapted to contain and dispense liquid, gaseous or fluent materials, means being provided for initially closing the discharge passage to isolate the outlet opening from the inlet opening.

In the prior art, it has been conventional to provide synthetic plastic receptacles with separate dispensing valve means that are secured (adhesively or by heat fusion) to the receptacle walls. Such a construction normally requires manual assembly of the valve to the receptacle body, with the result that automatic production is not permitted, and the attendant production costs are increased. The present invention was developed to avoid the above and other disadvantages of the prior plastic receptacles.

The primary object of the present invention is to provide a receptacle formed from a sheet of synthetic plastic material, said receptacle having integrally formed therein a discharge passage that extends along one edge of the receptacle. At one end the discharge passage has an inlet opening communciating with the interior of the receptacle, and at the other end an oulet opening through which the material is dispensed. The discharge passage is initially closed (by a weak heat seal or by a strip of adhesive) intermediate its ends, whereby the outlet opening is initially isolated from the inlet to prevent discharge of material from the receptacle. The discharge passage is at least partially defined by a strip folded from a wall portion of the plastic receptacle, at least one edge of the strip being secured to the wall (for example, by adhesive or by a heat seal).

According to a more specific object of the invention, the inlet opening is formed at the joint between the edge of the folded strip and the receptacle wall, and the outlet opening is formed in the said receptacle wall.

A still further object of the invention is to provide a receptacle of the type described above wherein at least a portion of the material defining the discharge passage has a different thickness or a different degree of flexibility than a wall portion of the synthetic plastic receptacle.

As a consquence of the present invention, it is achieved that a number of receptacles may be made continuously on a machine adapted for the said process. The material for the receptacle consists of synthetic plastic material, whereby during continuous feeding of the plastic sheet to the machine, the apertures are formed by punching, the strip is bent from the sheet to partially define the discharge passage, the edges of the strip are joined to the sheet (for example, by heat sealing or by an adhesive), and the receptacle is severed from the sheet. Since the inlet and outlet openings may be formed prior to the complete formation of the receptacle, the continuous production of the receptacles is greatly facilitated.

The invention is illustrated in the drawing showing several forms of plastic receptacles according to the invention, in which:

FIG. 1 is a front elevational view of one embodiment of the invention;

FIG. 2 is a sectional view taken along line II—II of FIG. 1;

FIG. 3 illustrates another receptacle embodiment formed from two parallel plastic sheets;

FIG. 4 is a sectional view taken along line IV—IV of FIG. 3;

FIGS. 5–7 are detailed illustrations of various receptacle embodiments having various passage sealing configurations and opening configurations; and FIG. 8 illustrates the manner of insertion of a filling tube or pipe within the discharge passage.

A receptacle 1 formed of synthetic plastic material includes an integral discharge passage for the substance to be kept in the receptacle. The passage is situated by the edge of one side of the receptacle and it is formed by means of a continuous strip of material running in the entire length of the receptacle. The said continuous strip may be made by folding one part 2 of one of the walls of the receptacle, the edges of the strip being joined to the sheet by heat seal or adhesive seams 3, 4, 5 and 6, thus defining the narrow discharge passage 7. In the neighbourhood of the ends of the said space and in the walls of the said space are provided apertures 8 and 9 for filling and emptying of the substance for which the receptacle is intended used. The aperture 8 is located in the outer wall of the space 7, while the aperture 9 is located in the inner wall of the space 7 and is made by an incision in the bent or folded part 2. The aperture 8 has a configuration defining the flap 10 that is adapted to move outwardly. For initially isolating the inlet and outlet openings, the discharge passage 7 is closed intermediate its ends by the transverse seal lines 11 (which may consist of a weak heat seal seam, pressure sensitive adhesive, or the like) that are easily penetrated by a suitable organ for opening or closing when filling or emptying the receptacle. The embodiment 11a of FIGS. 5 and 6 offers the advantage of being more easy to penetrate than the embodiment 11 of FIGS. 1, 3, 7 and 8. In the embodiment shown in FIG. 6 the valve has an inner aperture 9a the shape of which in section is round. In the embodiment shown in FIG. 7 the receptacle includes outlet 8a and inlet 9a both of which have a round shape in section.

The various openings may be punched or cut out of the sheet of synthetic plastic material and of the bent or folded part 2 before performance of the seaming assembly of the receptacle, and the material may be fed and the apertures punched or cut out and the edge of the sheet be bent or folded and heat sealed or glued and the finished receptacle cut during a continuous feed in a machine adapted for the purpose.

To obtain an under certain conditions desirable strength or rigidity of the discharge passage, at least a wall portion thereof may be of a flexibility or rigidity other than that of the remaining part of the receptacle. This may be achieved by using for the said strip a sheet portion of greater or lesser thickness as the case may be or by heat sealing or gluing an additional strip of plastic material onto the said part during the feed into the machine and prior to the bending or folding.

Instead of making the receptacle from a single piece of material it may be made from two pieces 12 and 13 running parallel and heat sealed or glued together as shown in FIG. 3. In doing so the two pieces of sheet material may be of different thickness or different quality.

For the purpose of filling or emptying the receptacle, a rod or a tube 14 may be introduced through the apertures as shown in FIG. 8. The flap 10 designed for cooperation with the aperture 8 is intended to ease the insertion of the rod or tube 14. When the rod or tube 14 is withdrawn from the discharge passage the pressure inside the receptacle will press the edge of the inlet aperture 9 against the receptacle wall to thereby close the receptacle, said closing being further achieved by the heat seal or adhesive seal strips 11.

What we claim is:
1. A receptacle formed from synthetic plastic material, comprising:
   a pair of spaced parallel synthetic plastic walls the edge portions of which are connected to define a chamber for receiving material to be dispensed;
   means including a strip of synthetic plastic material secured to one of said walls within said chamber to define a discharge passage,
   said receptacle containing an outlet opening at one end of said discharge passage for dispensing material therefrom, and an inlet opening affording communication between the other end of said passage and the receptacle chamber;
   and seal means closing said discharge passage intermediate its ends to isolate the outlet opening from the inlet opening.

2. Apparatus as defined in claim 1 wherein said strip defining said discharge passage comprises a reversely bent portion of one of said receptacle walls.

3. Apparatus as defined in claim 2 wherein the inlet opening is contained in said strip, and the outlet opening is contained in that portion of one of said walls that defines said discharge passage.

4. Apparatus as defined in claim 1, wherein said strip has a different structural flexibility than that of said walls.

5. Apparatus as defined in claim 1, wherein said walls are integrally joined along a common edge by a fold line; whereby the walls are formed by folding from a single synthetic plastic sheet.

6. Apparatus as defined in claim 1, wherein the entire peripheral edge portions of said walls are joined by a heat seal seam, whereby the walls may be formed from separate synthetic plastic sheets.

7. Apparatus as defined in claim 1, wherein the entire peripheral edge portions of said walls are joined by an adhesive seam, whereby the walls may be formed from separate synthetic plastic sheets.

References Cited by the Examiner

UNITED STATES PATENTS 3,201,029   8/1965   Batosti et al. _____ 150—9 X

FRANKLIN T. GARRETT, *Primary Examiner.*